United States Patent
Ros et al.

(10) Patent No.: US 7,971,000 B2
(45) Date of Patent: Jun. 28, 2011

(54) METHOD AND SYSTEM FOR MAINTAINING CONSISTENCY OF A CACHE MEMORY ACCESSIBLE BY MULTIPLE INDEPENDENT PROCESSES

(75) Inventors: Frédérick Ros, Nice (FR); Rudy Daniello, Nice (FR); Luc Isnardy, Nice (FR); Claudine Reynaud, Nice (FR); Wayne Rubenstein, Nice (FR)

(73) Assignee: Amadeus s.a.s., Biot (FR)

( * ) Notice: Subject to any disclaimer, the term of this patent is extended or adjusted under 35 U.S.C. 154(b) by 777 days.

(21) Appl. No.: 11/886,514

(22) PCT Filed: Mar. 8, 2006

(86) PCT No.: PCT/EP2006/060567
§ 371 (c)(1),
(2), (4) Date: Feb. 20, 2008

(87) PCT Pub. No.: WO2006/097424
PCT Pub. Date: Sep. 21, 2006

(65) Prior Publication Data
US 2008/0183970 A1  Jul. 31, 2008

Related U.S. Application Data

(60) Provisional application No. 60/661,913, filed on Mar. 16, 2005.

(30) Foreign Application Priority Data

Mar. 16, 2005 (EP) .................................. 05102054

(51) Int. Cl.
*G06F 12/00* (2006.01)
*G06F 13/00* (2006.01)
*G06F 13/28* (2006.01)
(52) U.S. Cl. ........................................ 711/133; 711/130
(58) Field of Classification Search .................. 711/130, 711/133
See application file for complete search history.

(56) References Cited

U.S. PATENT DOCUMENTS

| 6,275,832 | B1 | 8/2001 | Watts et al. | |
|---|---|---|---|---|
| 6,295,574 | B1 | 9/2001 | MacDonald | |
| 2001/0049771 | A1* | 12/2001 | Tischler et al. | 711/133 |
| 2003/0041280 | A1* | 2/2003 | Malcolm et al. | 714/4 |
| 2003/0195866 | A1 | 10/2003 | Long et al. | |
| 2005/0251627 | A1* | 11/2005 | Brown et al. | 711/133 |
| 2006/0004963 | A1* | 1/2006 | Mattina et al. | 711/130 |
| 2006/0064549 | A1* | 3/2006 | Wintergerst | 711/134 |

* cited by examiner

*Primary Examiner* — Kevin L Ellis
*Assistant Examiner* — Ryan Bertram
(74) *Attorney, Agent, or Firm* — Young & Thompson

(57) ABSTRACT

The invention concerns a method and a system for maintaining consistency of a cache memory, accessible by multiple independent processes. The processes can share common data. The processes perform simultaneous data searching operations optionally followed by providing the data to the processes, a removal of same or an insertion of new data. The searching, removal and insertion operations, are comprehensively executed once they have been initiated by the independent processes. They are executed excluding one another when they must operate on common data. The removal or insertion operations are each completely reversible. In that context, the invention provides that the operations for providing, removing or inserting the data have a finite or bound duration of execution so as to prevent any locking. In particular, the insertion operation, which includes a step of releasing an input when a partition of the cache memory is full, if it requires browsing through the entire partition to make a selection, is however possibly interrupted if the maximum browsing time is reached. In that case, the most appropriate input, among the already browsed inputs, is released. The inputs of said partition are browsed exhaustively, which results from storing the last consulted address of the partition after each release.

12 Claims, 8 Drawing Sheets

Data table

| Next | Previous | Hash Value | Hash Table Input | Data Table | Inputs in the Data Table | |
|---|---|---|---|---|---|---|
| 0 | | | | | | |
| 3 | 0 | XX_XX | 123 | 1 | 0 | |
| 4 | 0 | 0 | 0 | 1 | 1 | Free |
| 0 | 1 | XX_XX | 123 | 1 | 2 | |
| 0 | 2 | 0 | 0 | 1 | 3 | Free |

| | Next | | Use | Expiration | Data Table | Inputs in the Data Table | |
|---|---|---|---|---|---|---|---|
| 0 | | | | | | | |
| 1 | 2 | | 0 | 23 | 1 | 0 | |
| 2 | 3 | | 1 | 12 | 1 | 1 | |
| 3 | 0 | | 0 | 45 | 1 | 2 | |
| 4 | 6 | | 2 | 32 | 1 | 3 | |
| 5 | 7 | | 0 | 129 | 1 | 4 | |
| 6 | 8 | | 1 | 65 | 1 | 5 | |
| 7 | 0 | | 6 | 44 | 1 | 6 | |
| 8 | 0 | | 0 | 32 | 1 | 7 | | current time = 15

| | Next | | Use | Expiration | Data Table | Inputs in the Data Table |
|---|---|---|---|---|---|---|
| 0 | | | | | | |
| 1 | 3 | | 0 | 29 | 1 | 0 |
| 2 | 0 | | 0 | 192 | 1 | 1 |
| 3 | 0 | | 0 | 45 | 1 | 2 |
| 4 | 6 | | 2 | 32 | 1 | 3 |
| 5 | 7 | | 0 | 129 | 1 | 4 |
| 6 | 8 | | 1 | 65 | 1 | 5 |
| 7 | 0 | | 6 | 44 | 1 | 6 |
| 8 | 0 | | 0 | 32 | 1 | 7 |

Figure 11

METHOD AND SYSTEM FOR MAINTAINING CONSISTENCY OF A CACHE MEMORY ACCESSIBLE BY MULTIPLE INDEPENDENT PROCESSES

TECHNICAL SCOPE OF THE INVENTION

This invention relates to software engineering in general and describes more particularly a method and system for maintaining in the long term the consistency of the data in a cache memory accessible by independent processes in an information technology environment requiring permanent availability of this data and guaranteeing short access times to them.

STATE OF THE ART

Although the calculating power of computers and their central processing unit (CU or CPU, i.e. Central Processing Unit in English technical literature) has grown substantially over the years, increasingly demanding software applications are at the same time taking advantage of this increase in processing power by making more and more use of these central units. This is particularly the case when they have to access data available in a centralised memory, which may have to store enormous quantities of information, for example the databases containing worldwide bids for air traffic. It must be possible to consult these data continuously from innumerable travel agents and sales points, and to update them through airlines throughout the world on a 24-7 basis.

Whatever the configurations, computer networks and IT solutions used to obtain this result, the expected performances, in particular short access time to the information sought, always involve the use of a memory hierarchy. The information sought must in fact be fed into a memory which the central units can access sufficiently quickly, even if such a memory may not then contain all the information likely to be sought. This type of memory is called a cache memory or bulk storage. The cache memory serves to store the data a system most frequently accesses at a given time, thus enabling the wait conditions of the central units and computer processors to be reduced.

The necessarily limited size of a cache memory must be able to be shared among the different independent processes that must be carried out simultaneously in the central units. Moreover, when they are working on common data, the multiple independent tasks should preferably be able to do so without having to duplicate these data.

The management of a cache memory accessible by multiple processes is therefore a complex business. In particular, it is essential to maintain the consistency of the data common to several processes. If one of them has to modify the said data, it is extremely important for another process to be able to use them before they have been completely modified and updated. Although it is well known that this may be achieved by the exchange of messages between processes, this is a method which seriously impacts on the speed of access to this data due to the time required to exchange the messages.

Another method currently used consists in enabling a process to obtain, exclusively and temporarily, the right of access to the shared data, thus blocking access by the other processes, which must wait. However, once a process has obtained such an exclusive right of access, it may also itself have to wait for another process to release the data it also has to use. Obviously there are therefore cases where two or more processes are interlocked, one waiting for the other to finish, and vice versa. The tasks which theses processes must execute do not progress and there is blockage.

It is of course possible to have as many cache memories as processes. There is therefore replication of the common data in the cache memory, which is to be avoided largely to ensure that better use is made of the available memory space and again poses the problem of consistency of the replications within the same.

Moreover, a cache memory does not merely contain working data used by the processes themselves, but it must be strictly organised. In fact a cache memory is always a partial, highly dynamic view of all the data present in a slower, low cost but very large memory located in the backplane, typically, of the batteries of magnetic discs capable of storing terabytes ($10^{12}$ bytes) of data. This working data is all potentially accessible by the processes at a given time after their transfer to the shared cache memory. The organisational data of the cache memory must therefore make it possible to maintain the consistency between the working data actually present at a given time in the cache memory and their correspondence in the backplane memory. However, if a process is interrupted before its normal termination (for example, simply because an operator has prematurely terminated a request) or if it is executed incorrectly due to weak programming of the software, it may therefore happen that the organisational data of the cache memory is not fully updated or it is updated incorrectly. The control tables containing this organisational data then become partially corrupted. Although the application software is generally designed to be tolerant to breakdowns and errors to prevent partial corruptions from having major consequences, their accumulation in a system which has to be operational round the clock in the long term, degrades the performances and the efficiency of the cache memory in particular in the long term by reducing the size of the memory that can actually be used, which no longer enables sufficient working data that can be shared by all the processes that must be executed at a given time to respond to the multiple requests deriving from computers that must have access to large databases such as those containing the information on world air traffic or the reservations of large hotel chains.

The size of a cache memory that can be used effectively is therefore a key parameter of its operation. It must be filled to the optimum degree. In particular, a process must always be able to supply new working data to respond to new client requests, even if the cache memory is already full. This can only be achieved by releasing space, and therefore by removing the memory the working data less likely to be re-used, or the data which is effectively out of date or too old. This solution presents the serious disadvantage that if the basic task is no longer normally executed, the cache memory quickly becomes unusable because it is filled with out of date data. Moreover, the basic task cannot generally release data corrupted by a process which has not been fully or normally executed.

In a system which has to operate round the clock and which is therefore never restarted, its reliability must be based on the correct operation of typically a single element of the basic task described above, as is often the case, however.

A mechanism that tends to remedy some of the weaknesses of the prior art, which have been described above, has been proposed in a patent application made to the American Patent Office or USPTO (United States Patent and Trademark Office), under number 2003/0195866. Published on 16 Oct. 2003 under the title "Transaction-aware caching for access control metadata", this patent application makes no attempt, however, to describe any particular mechanism for releasing space in a cache that is already full. This is therefore an operation that is very often necessary after a certain time of use in a system which has never been restarted, and in which successive requests tend constantly to accumulate data in the cache memory.

The object of the invention is therefore generally to remedy the weaknesses of the prior art and to make improvements in the management of a cache memory by preventing any locking of the processes in order, in particular, to release space when the memory has to accommodate new data.

SUMMARY OF THE INVENTION

The invention describes a mechanism for maintaining the consistency of a cache memory that is accessible by independent processes. The processes may share common data. The processes perform simultaneous data search operations followed optionally by making available the data to the processes, removal of the same or insertion of new data. The search, removal and insertion operations are executed comprehensively once they have been initiated by the independent processes. They are executed mutually exclusively when they have to operate on common data. The removal or insertion operations are each completely reversible. In this context the invention provides that the operations for making available, removing or inserting the data are of finite or limited duration of execution to prevent any locking. In particular, the insertion operation, which includes a stage of releasing an input when a partition of the cache memory is full, if it requires browsing through the entire partition in order to make a selection, may be interrupted, however, if the maximum browsing time is reached. In this case the most suitable input from among the inputs already browsed is released. The inputs of the partition are browsed exhaustively, which results from storing the last consulted address of the partition after each release.

BRIEF DESCRIPTION OF THE FIGURES

The objectives, objects, as well as the features and advantages of the invention, will be more evident from the detailed description of a preferred embodiment of the latter, which is illustrated by the following accompanying drawings in which:

FIG. 11 describes the method for releasing an input in a full data table.

DETAILED DESCRIPTION OF THE INVENTION

Figure 1:
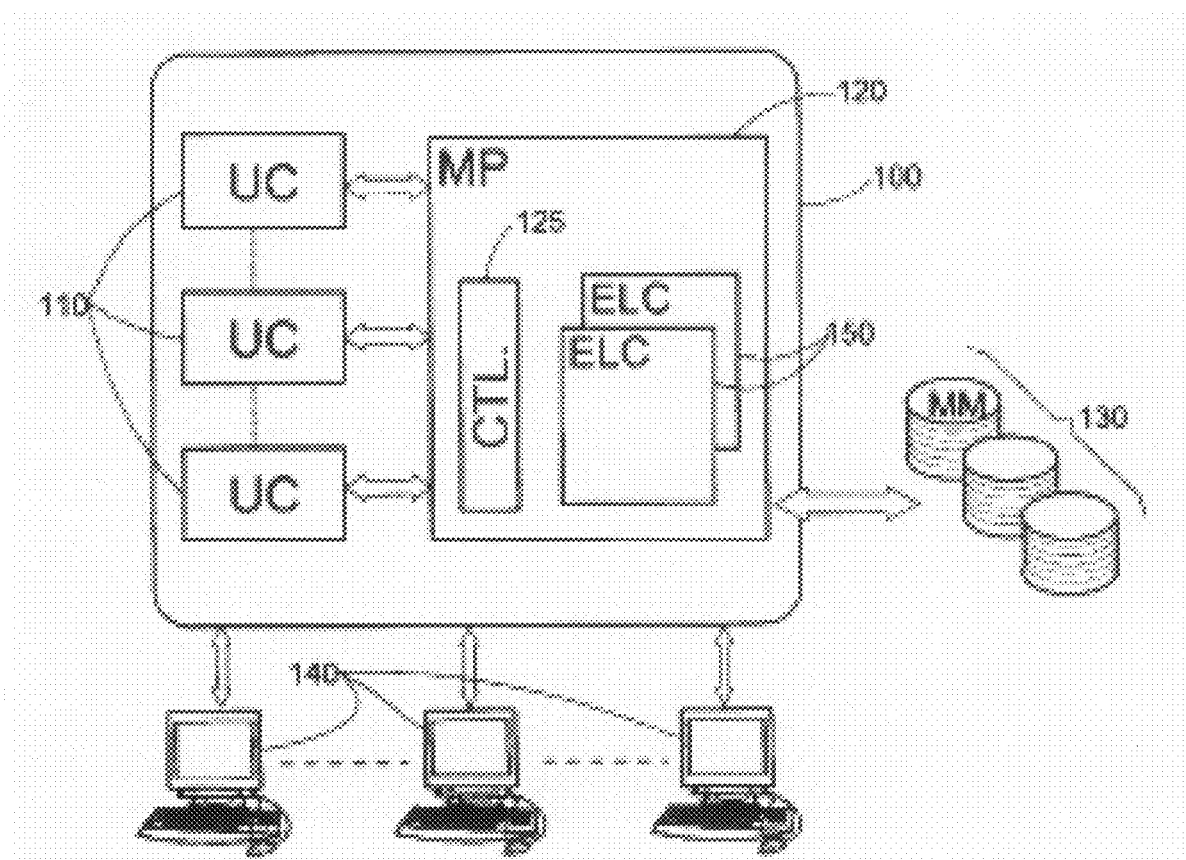
FIG. 1 describes the environment in which the invention is implemented.

As illustrated diagrammatically in FIG. 1, the invention relates to a system (100) which comprises one or more central units (CU's) of computers (110) sharing a rapid access storage means (120). However limited in size, the shared memory (SM) may itself access one or more mass memories (MM) located in the backplane and generally consisting of batteries of magnetic discs (130) that are able to store very large quantities of data. In particular, data bases, for example those which have to be consulted by travel agencies throughout the world and which collect all the information on world air traffic or reservation statuses of international hotel chains. The central units operate under the control of an operative system. For example, UNIX is a frequently used operative system because it not only enables numerous users (140) to be processed simultaneously, but it is also able to generate a large number of tasks of processes which operate independently at the same time. In the shared system comprising a control mechanism (125), the operative system, directly or by mean of additional software layers integrated in the operative system, therefore enables one or more cache logic entities (CLE's) to be defined. As already discussed in the paragraph on the state of the art, the purpose of these cache memories (150) is to be able to supply to a rapid access memory, the shared memory (120), from the mass memory (130), the data on which the independent processes, initiated by the central units (110), must be able to work at a given time.

Figure 2:
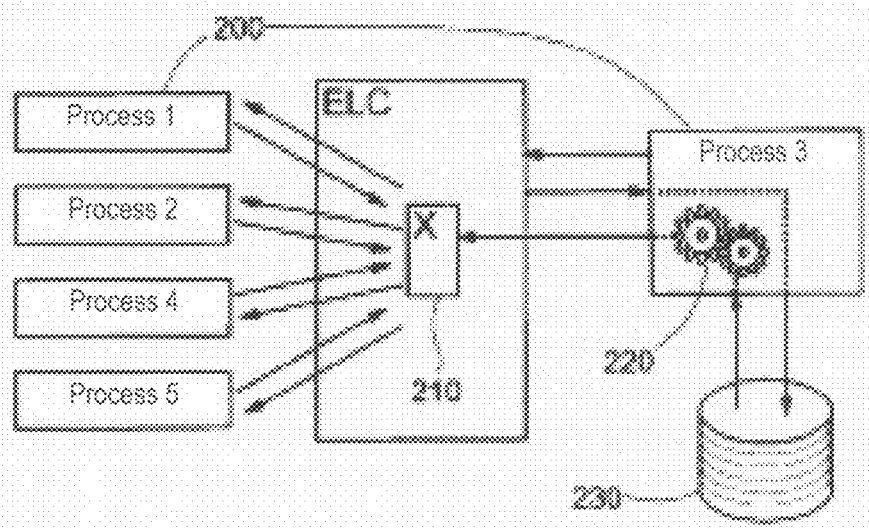
FIG. 2 shows the sharing of a CLE (cache logic entity) by independent processes.

FIG. 2 describes in greater detail a new aspect of the invention which enables independent processes (200), in this example referenced form 1 to 5, to share an entity of common data (210) after only one of these processes, that denoted by number 3 in this example, has had to find data in the mass memory (230) and carry out the formatting and calculations required (220) for their effective use by all the processes likely to have to work on these data at a given time. This procedure substantially reduces the storage requirements in the cache memories contained in the shared memory by increasing its efficiency to the same degree and greatly relieving the central units, since the formatting calculations are only carried out by the process denoted by number 3 in this example.

Figure 3:
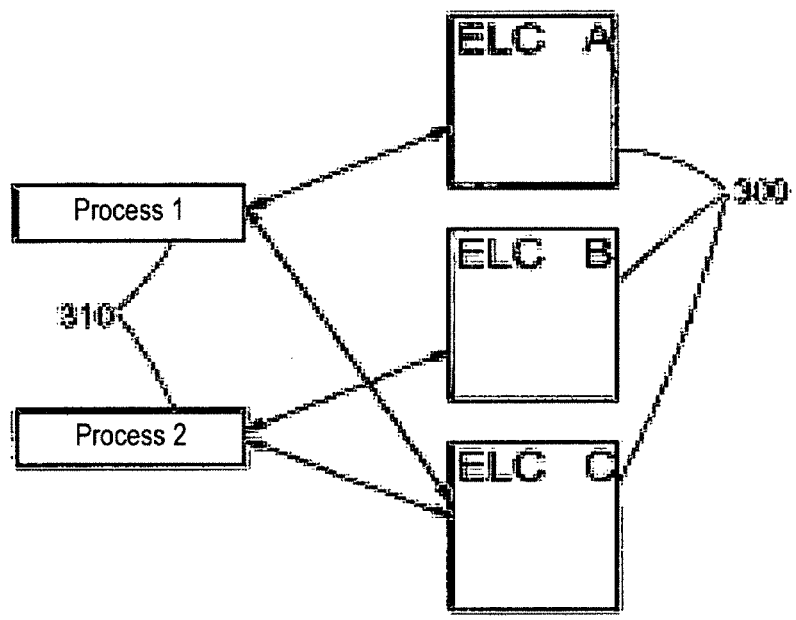
FIG. 3 describes the case in which several CLE's are accessed by independent processes.

FIG. 3 is intended to show whether the data can be advantageously shared among the processes of the same CLE. Where several CLE's coexist (300) in the shared memory, the invention also ensures that the processes (310) do not necessarily have access to all the CLE's. In this particular example, therefore, process 1 has access to CLE's A and C, whilst process 2 has access to CLE's B and C. Only the data present in CLE C is therefore common to processes 1 and 2, which may be considered useful, for example, for preventing process 2 from altering the data which only process 1 is authorised to modify, data which will then preferably be contained in CLE A.

Figure 4:
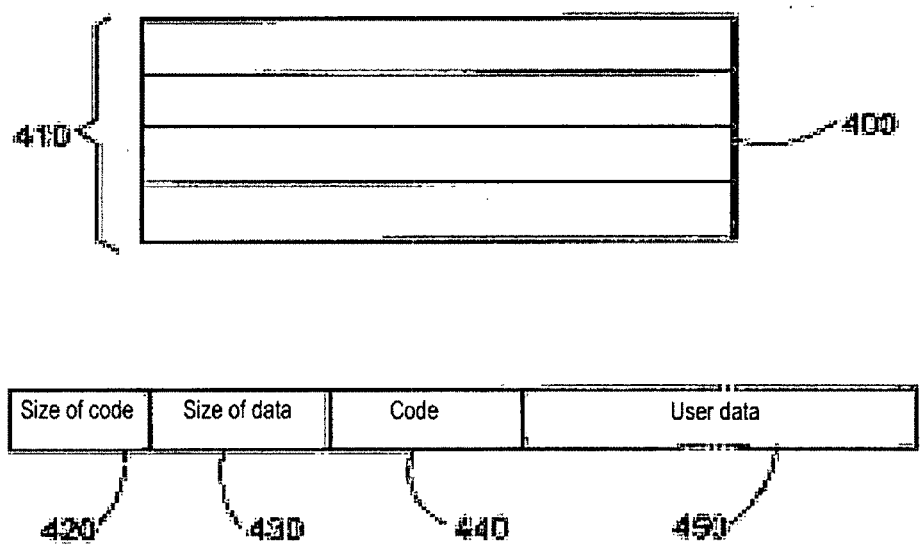
FIG. 4 describes the structure of the data tables of a CLE.

The following figures describe the different tables used by a CLE to find and update the data contained at a given time in the cache memory. FIG. 4 describes the organisation of a data table. As the name suggests, a data table (44) serves mainly to store the user data as well as the unique or identifying code associated with them and parameters described in the following. The maximum number of data tables that may be present in a CLE can be set during the configuration of the system. For example, the creation of a hundred data tables may be authorised. Moreover, each of these tables may include a variable number of inputs (410), four in this example, themselves being of a size that can be specified at the time of configuration so that the tables can be better adapted to the user data they have to accommodate in a particular application of the invention. The format of each of the inputs of a data table includes our fields containing:

the size of the code (420),
the size of the user data (430), the unique code identifying the data (440). Typically this code is a field of several tens of bytes, including sufficient information to identity the type of associated data, the user data itself (450). For example, it may be prices charged by an airline for a given destination and a given period.

Figures 5, 6:
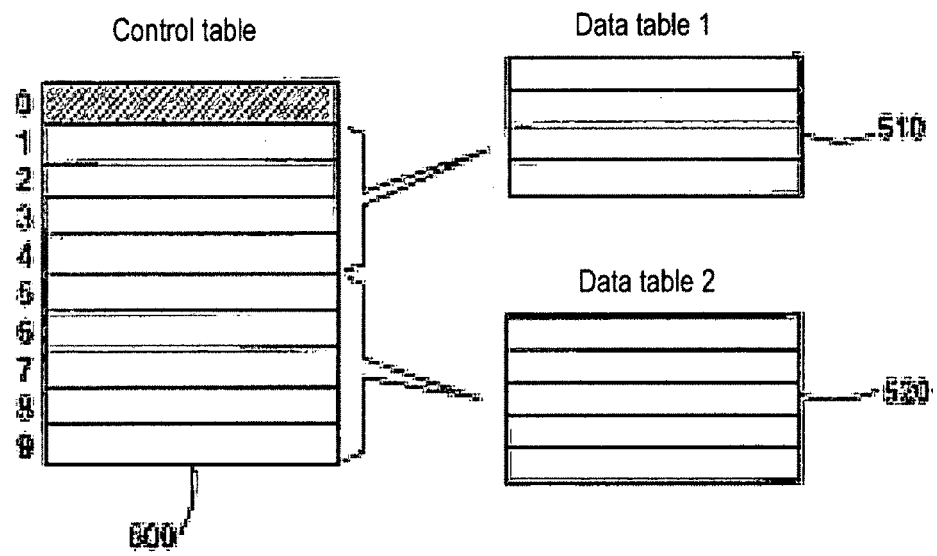
FIG. 5 describes the control table associated with the data tables.
FIG. 6 gives an example of the content of a partition of the control table.

FIG. 5 describes the control table, which is used to keep track of the user data present at a given time in a CLE. There is one to one correspondence between the inputs of the control table (500) and the data tables (510, 520). The number of inputs in the control table is therefore the same as the maximum number of data tables specified at the time of configuration, multiplied by the number of inputs in each of these tables. In the simple example in FIG. 5, which only shows two data tables, the first (510) comprising four inputs and the second (520) five, the associated control table (500) therefore includes a total of 9 active inputs.

It will be noted that input 0 of these tables is always unused so that each field 0 has a particular significance: that of indicating the absence of a reference to an input.

Each input in the control table includes the following information:
The hash value of the code associated with the data
The date of insertion of the data
The date of expiration of the data
The size of the data stored at the corresponding input of the data table.
The next input in the chained list of inputs (free or used) of the control and data tables, or the value 0 if there is no other chained input.
The preceding chained input or value 0 if there is no other chained input.
The corresponding input of the hash table, which is described with FIG. 8, or value 0 in the case of the chained list of free inputs.
The number of the data table associated with this input of the control table.
The corresponding input in the data table.
The utilisation meter (to determine which of the inputs has been the least recently used)
Various parameters, including in particular a binary indicator for indicating that the corresponding input is free and may be used.

FIG. 6 gives an example of what the partition of the control table corresponding to data table 1 in FIG. 5 could contain. In the interests of clarity the parameters in the above list do not all appear in the table in FIG. 6.

In this example inputs 2 and 4 are free (600). They are double chained so that they can browse the list in both directions, and they could be used to store user data. Free input 2 therefore references the net free input, 4 (610). The latter references the preceding free input, 2 (620).

The inputs used, 1 and 3, belong here to the same chained list which is used to resolve collisions resulting from the identical hashing of codes that are nevertheless different. They reference a particular input of the hash table (630), input 123. The hash table and the hashing of the identification codes are discussed in detail in FIG. 8 below. like the list of free inputs, the list for resolving the collisions is also double chained: input 1 references the next input used (640), 3, which itself references the preceding input (650) in the list, 1.

As already discussed the zero values of the 'next input' and previous input' columns make no reference to any input and start or end a chained list.

Figure 7:
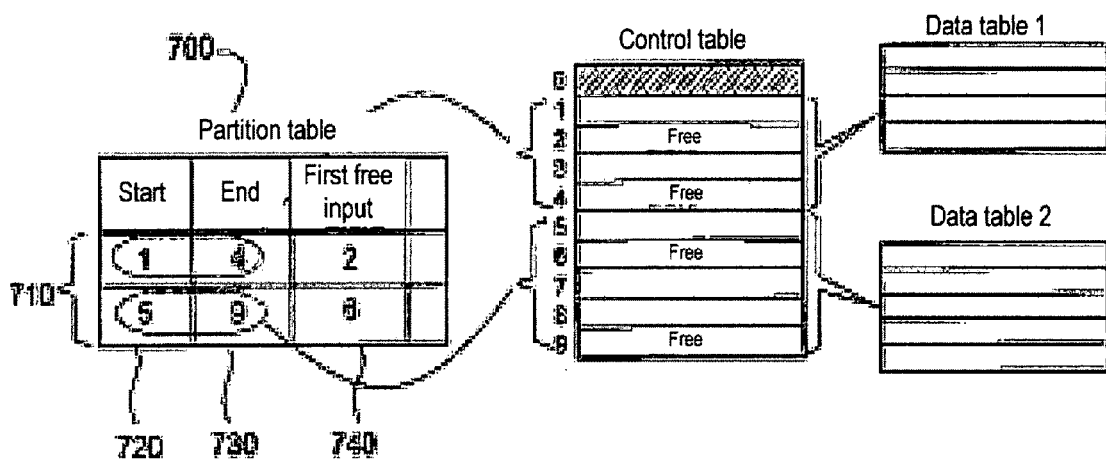
FIG. 7 describes the structure of the table of partitions.

FIG. 7 describes the table of partitions (700). As its name suggests, the partition table serves to store the information required to determine how the control and data tables are organised and partitioned. Therefore there are as many inputs (710) in the partition table as there are data tables, i.e. two in the example shown in the preceding figures. Each input in the partition table that references the corresponding data table (the first input references table no. 1 and so on) includes the following parameters which, for the sake of clarity, do not all appear however in the diagram of the partition tables in FIG. 7:

The index in the control table for the first input of the corresponding partition (720)
The index for the last input (730)
The number of inputs in this partition
The size of the inputs in this partition
The number of free inputs
The first input in the chained list of free inputs (740)
A partition locking indicator
The index in the control table from which the next search for an input likely to be removed will commence.

Figure 8:
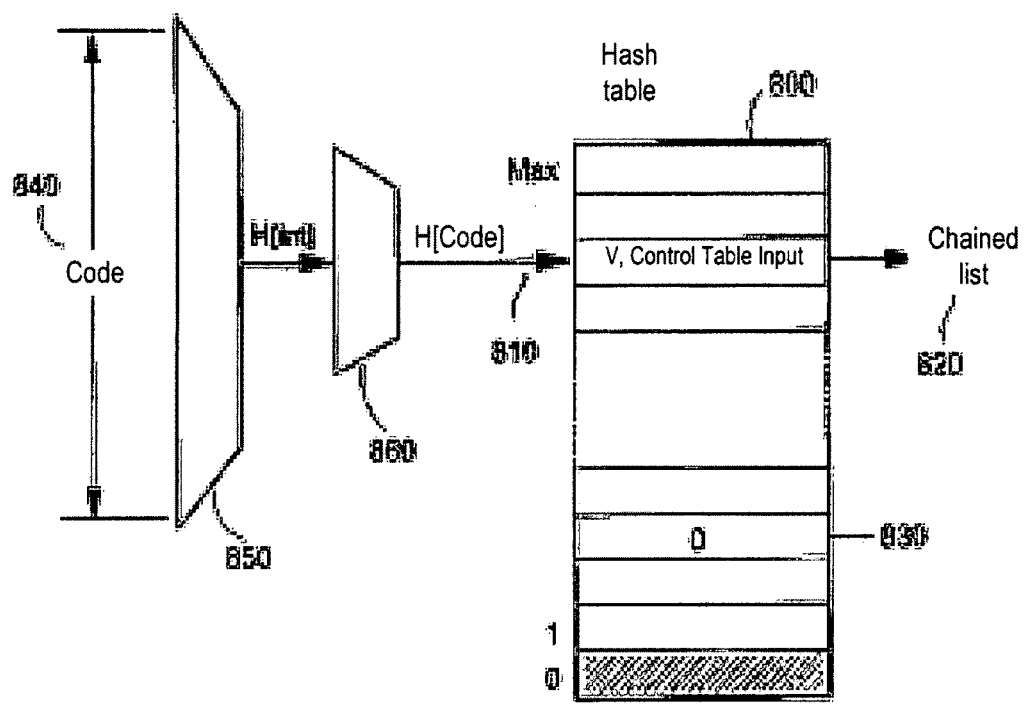
FIG. 8 describes the structure and addressing of the hash table.

FIG. 8 describes the hash table (800), which is the starting point for any search in the CLE.

The starting point in the hash table (810) is the value resulting from hashing the data identification code, which is a unique code associated with the data and which is described in the previous figures. For the reasons already mentioned, input 0 must remain unused and the hash function must return a value of between 1 and the upper addressing limit of the hash table. The hash table may be set during the system configuration. The invention does not assume the use of a particular hash function. To attempt to obtain a minimum of collisions, the ultimate objective of any hash function, possibly dependent on the structure of the codes, it will be possible to select one or other of the numerous hash functions and methods that have been proposed in the abundant technical literature on this subject. However, the hash function must be selected, or adapted, so that the value 0 is always excluded.

In a preferred embodiment of the invention, shown in FIG. 8, the unique identification code (840), which typically requires 50 to 100 bytes, undergoes a first hash (850) to obtain a value within a field of 64 bits, for example, referred to in the following as H[int]. However, since the hash table cannot in practice include $2^{64}$ inputs, a second hash (860) of H[int] is carried out to obtain a table (80) of reasonable size. For example, you may want to reduce the field of 64 bits to a field of 18 bits, i.e. approx. 256,000 inputs ($2^{18}$). The advantage of proceeding to a double hash is that it is possible to obtain a hash table of reasonable size whilst allowing the comparison in a field of bits (64 bits) that can be handled quickly by a processor in order to remove doubts in the event of a collision in the hash table. In fact, careful choice of the first hash function allows an almost zero probability of collision, even though the collisions will be more numerous after an additional reduction to 18 bits, for example. A full comparison of the codes, comprising 50 to 100 bytes, will therefore never have to be carried out more than once, as discussed above in connection with FIG. 9.

Referring again to FIG. 6, it is therefore the intermediate hash value H[int], comprising 64 bits in the above example, that is present in the control table (660) and will be mainly used to accelerate the comparisons.

The final hash value (810) of the code associated with the data H[CLEF] is used to consult the hash table. The corresponding input contains the following information:
A locking indicator (V) of the input to enable only one process at a time to modify the chained list (820), starting with that input in the hash table. This aspect of the invention is discussed later in the description.

The first input, in the control table, of the chained list used to resolve the possible collisions resulting from the code hash. Of course, if the data code hashing does not impose a collision on a particular input of the hash table, the corresponding chained list will be reduced to a single element.

The zero values in the hash table (830) do not reference any input in the control table. None of the data codes gives a hash value for this input.

Figure 9:
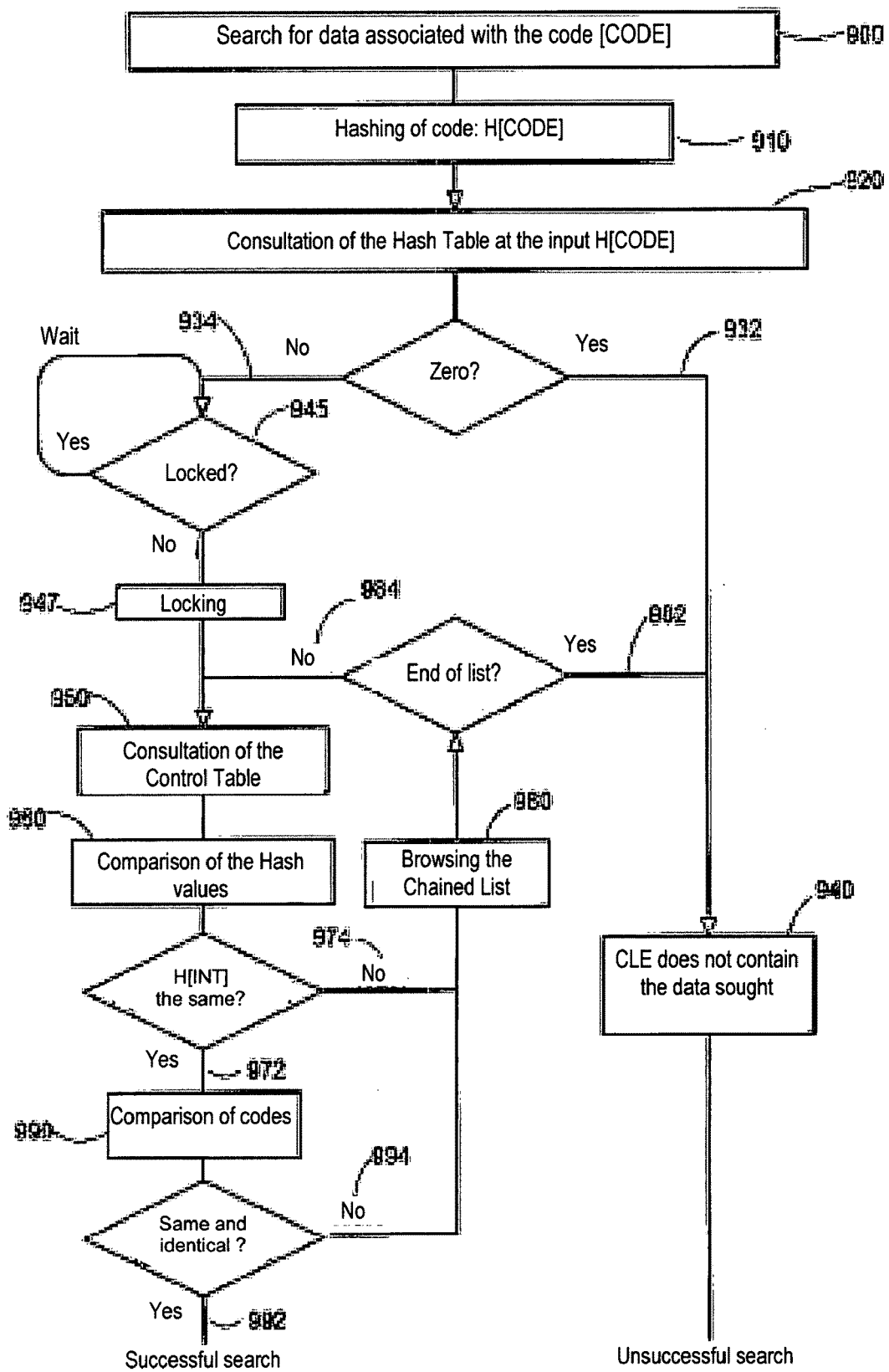
FIG. 9 describes the method of searching for data in a CLE.

FIG. 9 describes the method of access (900) to the data in the CLE. The search for data in a CLE commences with hashing of the code (910) associated with the data sought. The value obtained is used to address the hash table previously described (920). If the corresponding input is zero, the search may immediately be declared unsuccessful (932). This result is indicated immediately (940) to the process searching for the data in order to inform it that the data is not present in the CLE interrogated.

If the input addressed is not zero (934), the control table of the CLE must be read at the input referenced by the hash table (950). This input contains the first element, possibly the only element, of a chained list of inputs likely to contain the information sought.

This consultation of the control table will not take place immediately, however, if the corresponding input is locked by another process (945). It will then be necessary to wait for the latter to unlock the input to continue. The process in progress, if it is likely to involve a modification of the tales (removal or insertion), in turn locks the input of the hash table (947).

A first comparison of the hash code values is carried out (960), i.e. the value of the code hashing sought is compared with that extracted from the control table. As discussed in FIG. 8, in preferred embodiment of the invention, the comparison is made on an intermediate hash value H[int].

If they differ (974), the search must continue by browsing the chained list (98) if it contains more than one element. If there is only one element, or if the last element in the list (982) has been reached, the search must be declared unsuccessful (940).

However, if the hash values are identical (972), the code sought has possibly been found. However, no matter what hash function is able to return two identical hash values, starting from different codes, this must be verified. To remove any doubt the codes must then be compared (990). In a preferred embodiment of the invention the size of the code sought is first compared with that stored in the data table (at the input corresponding to that of the control table), in order to accelerate the comparison. If the codes are of different sizes they cannot be identical and the search must continue (994), as previously, by browsing the chained list, if it contains more than one element. If not, the search must be declared unsuccessful (940).

If the sizes of the codes are the same, a full comparison of these is finally carried out. If the codes are effectively identical (992), the search is successful. The data sought is present in the data table. If the codes differ, the search must continue as before by browsing the chained list.

It will be noted that a single full comparison of the codes (from 50 to 100 bytes) will in most cases be necessary when the data have actually been found. The probability of having to carry out more than one full comparison of the codes depends on the effectiveness of the first hash function used to minimise the collisions, as described in FIG. 8. As already discussed, this probability is practically zero.

Figure 10:
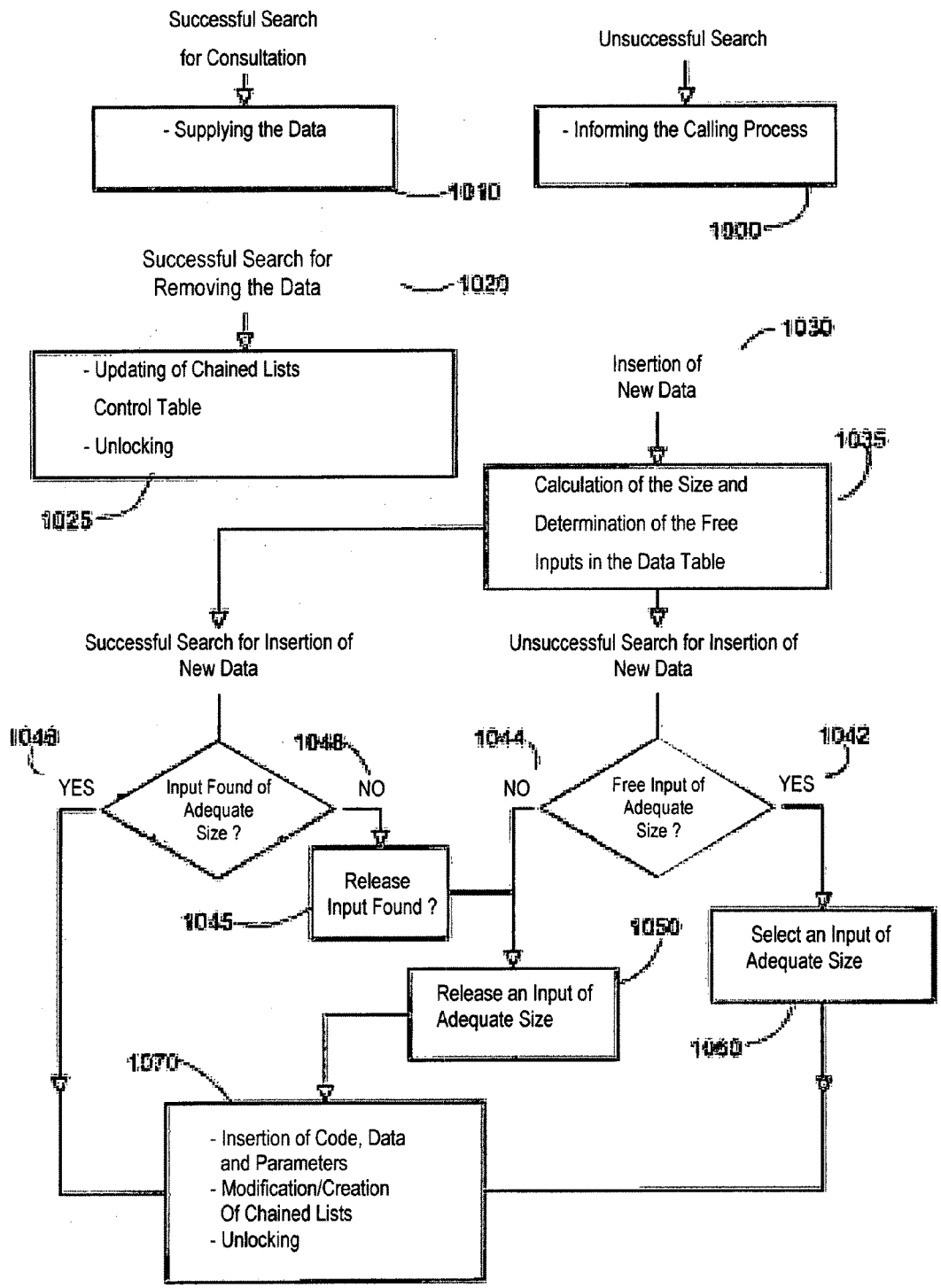
FIG. 10 describes the methods for making available removing, replacing and inserting data in a CLE.

FIG. 10 describes the different actions that follow the data search in a CLE.

In all cases, if the search is unsuccessful, the process initiating the search is informed of this (1000).

If the search is successful and has been initiated by a process for the purpose of consulting the data, the data is extracted from the data table and supplied to the process initiating the search (1010).

If the search is successful and has been initiated by a process for the purpose of removing (1020) the corresponding data in the CLE, the control table must be modified (1025). The corresponding input of the partition must be removed from the chained list of inputs used in this partition and added to the list of free inputs. An input is obviously removed from the chained list of used inputs by reconstituting, if necessary, the chained list by modifying the 'next' and 'previous' input fields, as indicated in FIG. 6.

If the process of inserting new data (1030) in a CLE depends mainly on whether or not the code is already present in it, the insertion always requires that the size necessary to be able to insert this data is first calculated (1035) to determine which of the free inputs from the data tables can be used.

If the search was unsuccessful, the insertion will then depend on knowing whether there is at least one free space of an adequate size remaining to accommodate the new data. If this is the case (1042), a free input is selected (1060) and the insertion of the new data is carried out (1070), which includes the modification and creation of chained lists in the control table.

If there is no free space of adequate size (1044), it is then necessary to release a space in the CLE (1050) to proceed with the insertion (1070). The method for releasing a space is described in greater detail in FIG. 11.

If the search was successful, the code sought is already present and it is necessary to modify the data contained in the data table. This then necessitates knowing whether there is sufficient space to store the new data in the same input. If the answer is yes (1046), the insertion can be proceeded with immediately (1070). However, if the size is not suitable (1048), it will be necessary, as before, to release an input of adequate size (1050). The input whose size is considered insufficient to be re-used (1045) will also have been previously released. This stage is equivalent to that already described above and which consists in removing data from the CLE (1020).

Finally, regarding FIG. 10 it will be noted that at the end of an operation involving a modification of the tables, i.e. the removal (1025) or insertion (1070) operations, the corresponding input of the hash table must be unlocked because the operation has ended.

FIG. 11 describes more particularly the stage (1050) of FIG. 10 which consists in searching for the best input to be released when there is no free space for accommodating the new data to be inserted. The method is described using an example of a partition of the control table (1100) comprising 8 inputs of sufficient size to accommodate the new data, all used. For the sake of clarity, only the fields in the control table required for an understanding of the insertion mechanism are represented.

In this example the partition, which references data table no. 1 (1110) and inputs 0-7 (1120), comprises 3 chained lists (1130), commencing with addresses 1, 4 and 5 and 3, 3 and 2 inputs respectively. The starts of the chains are themselves addressed by the hash table already described.

To release an input the insertion algorithm will use one or other or both of the following sets of information present in the control table:

The time (hour/date) at which the validity of the data associated with the input will expire (1140). This time must be compared with the current time in order to determine, by browsing all the inputs of the partition, whether one of the inputs has already expired and can be removed. In practice this time, as shown, takes the form of a value which a simple counter must reach when the data validity time expires.

The effective use of the inputs (1150), enabling it to be determined which input has remained unused for the longest time (least recently used or 'LRU', in the English technical literature on these subjects). In the example in FIG. 11 the highest value of the 'use' field indicates the input that has remained unused for the longest time, i.e. that of an address 7 in the control table (1155). It is this input that would therefore be likely to be replaced.

Depending on the type of use of the invention, the criteria for choosing to remove one input rather than another may be set very differently. Normal use of these parameters consists first in determining whether there is an input whose data has expired. If there is at least one input that satisfies this criterion, it is the first one found, for example, when browsing through all the inputs (1160), that is selected. If no input has expired data it will then be possible to remove the input that has remained unused for the longest time (1155). However, to avoid removing data too quickly a threshold may be established to take account of this last parameter. It may then happen that the criteria for removal of an input are not met within an initial period, in which case the algorithm must provide a less constraining fall-back strategy, such as that which would enable an input to be selected whose expiration time is as close as possible to the current time.

It will be noted that if the invention does not assume a particular method of using these parameters to release an input, it will make the explicit assumption that an input will always be released to accommodate new data in the cache.

The example in FIG. 11 assumes that since the current time has a value of 16, input 2 of the control table can be removed because the data for this input expired at time 12, which precedes it (1145). Since input 2 formed part of a chained list, the list must be modified (1134) and the new input, which only comprises one element, inserted (1132). The new status of the partition is therefore as indicated in the bottom table (1105).

In this example it was implicitly assumed that the new input also corresponded to a new input in the hash table, and that there is therefore no collision. It will be understood, of course, that the new input could correspond to a hash value which has already been used. In this case it should be added to the corresponding chained list instead of forming an additional list comprising only one element for the time being. The handling of chained lists is a practice well known to the persons skilled in the art and is not therefore described below.

As already discussed in the course of the description, the processes are free to use a CLE concurrently. Only two restrictions apply to prevent a process from using data not fully modified by another process.

As already indicated in FIG. 8, each input of the hash table includes a locking indicator for preventing two processes from attempting to modify an input of the CLE simultaneously. As shown in greater detail in stage (945) in FIG. 9, access is blocked if a process that has to modify the data tables is already executed from that input. However, there may be as many simultaneous accesses to a CLE as there are different inputs in the hash table. Only the multiple accesses from the same hash value, for operations involving a modification of the tables, are not possible because they would result in having to work on the same chained lists.

There is also a locking indicator in the inputs of the partition table described in FIG. 7. The purpose of this lock is to protect the updating of the chained lists of free inputs that independent processes, working in the same partition, would like to modify. The inputs of the partition table are locked particularly when space is released, i.e. in stages (1045), (1050) or (1025) described in FIG. 10 and unlocked under the same conditions as those of the hash table.

Therefore, the operations initiated by processes involving a modification of the data tables are always executed exhaustively before the inputs can be re-used by another process in the course of modification. The processes that must work on common inputs of the control tables mutually exclude themselves during their execution.

As indicated in FIG. 11, it will also have been noted that the insertion algorithm assumes that an input may have to be released in a full control table, and this table will then have to be browsed (1160) to select the most suitable input. To prevent a process from locking an input for too long a time, the invention process that this browsing can be limited, for example by specifying a maximum number of consecutive readings of the control table. This is why the partition table described in FIG. 7 also includes a parameter for specifying the point from which the search for an input must resume whenever this mechanism is actuated. This is to prevent the control table from always being browsed from the same point, e.g. the first input. Finally, this enables all the inputs to be browsed and allows each of them to be replaced.

Since the processes are of finite duration or are limited as far as those requesting the release of an input by browsing the control table are concerned, no permanent locking may take place.

Figure 12:
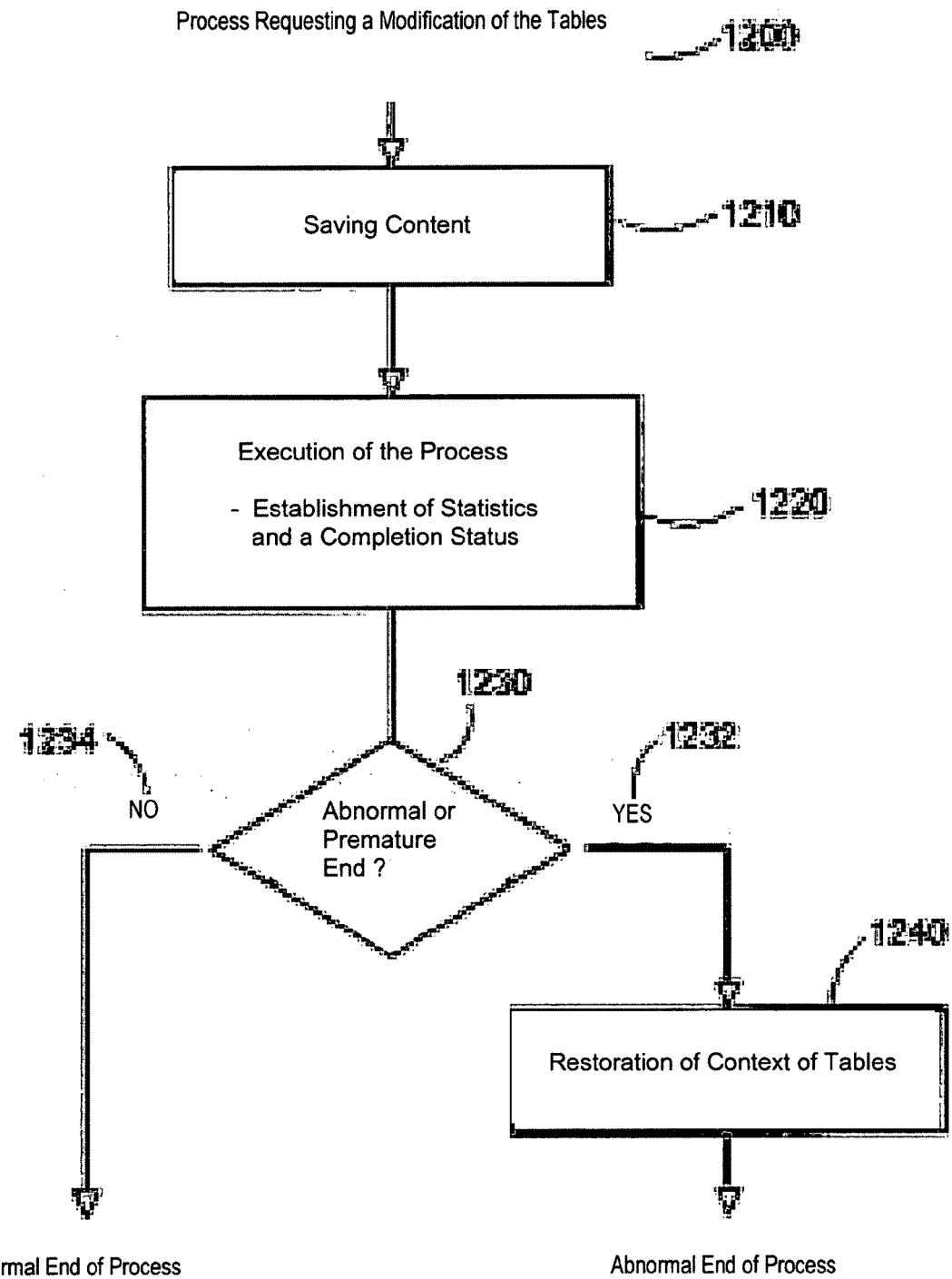
FIG. 12 describes the stages of the execution of a process serving to maintain the consistency of the tables.

FIG. 12 explains the case of processes which must normally alter (1200) the tables controlling a CLE in the course of their execution.

This is mainly the case with the insertion of new data, an operation described in FIG. 10, which requires the creation or modification of the chained lists.

A process which has to modify the tables of a CLE, and which would not be completed, must not leave the tables in an inconsistent state, for example by disturbing the chained lists which could no longer be browsed normally, which would lock the associated inputs of the data tables. The invention provides that the potentially dangerous processes must save the context of the tables (1210) before they are executed, i.e. they must store all the information required to be able to restore the previous state of the tables if they were not fully executed, or if an anomaly was detected in the course of execution.

Each process has a unique identifier (ID) and uses a dedicated working memory area in which this information is stored throughout its execution. For example, if a lock is created in the hash table, the identifier of the process is registered together with the reference of the input of the corresponding hash table. Similarly, the links of a chained list that is to be modified by a process are also registered. If the process encounters a problem (1232), a function associated with the processes is called upon to restore the previous state (1240). In the above examples the lock of the hash table is released and the links of the chained list restored. During its execution (1220), each process establishes not only statistics, which are used among other things to measure the efficiency of the cache memory, but also a completion status which is used (1230) to determine whether the process has been completed normally (1234).

The saving and restoration of the context of the tables, as well as the establishment of a completion status of the process, do not require mechanisms peculiar to the invention. All the methods well known to the software engineering specialists for implementing such mechanisms are likely to be used and are not therefore described further.

The invention claimed is:

1. A method for maintaining the consistency of at least one cache memory (150) accessible by a plurality of independent processes (20) sharing common data (210), said cache memory comprising a control table having a plurality of partitions including inputs wherein at least some of the inputs have different sizes, said plurality of processes carrying out simultaneous search operations (900) for data within the partitions, the method further comprising an insertion operation (1030) of new data into one of the partitions, said insertion operation comprising the steps of:
  releasing an input comprising:
    defining a maximum browsing time,
    determining the size of the new data,
    browsing inputs of the partition,
    interrupting the browsing of the inputs when the maximum browsing time is reached,
    selecting, from among the browsed inputs, a most suitable input having a sufficient size to accommodate the new data, and
    releasing the most suitable input; and
  inserting the new data in the most suitable input, thereby the insertion operation is of limited duration of execution.

2. The method according to claim 1, wherein selecting a most suitable input from among the browsed inputs comprises selecting unconditionally the last of the browsed inputs of a sufficient size to accommodate the new data.

3. A system, in particular a cache memory (15), used for making available a plurality of central processing units (110) for processing the data stored in a mass memory (130), said system comprising means adapted to implement the method described in claim 2.

4. A non-transient medium that can be read by a computer, containing the instructions of a program executable by said computer, said program implementing the method according to claim 2.

5. The method according to claim 1, further comprising: storing (700) the address of the last browsed input and operating a new insertion operation of further new data within the partition comprising:
  releasing an input comprising:
    defining a maximum browsing time,
    browsing inputs of the partition starting from the input situated next the last browsed input,
    interrupting the browsing of the inputs when the maximum browsing time is reached,
    selecting a most suitable input from among the browsed inputs, and
    releasing the most suitable input; and
  inserting the further new data in the most suitable input.

6. A system, in particular a cache memory (15), used for making available a plurality of central processing units (110) for processing the data stored in a mass memory (130), said system comprising means adapted to implement the method described in claim 5.

7. A non-transient medium that can be read by a computer, containing the instructions of a program executable by said computer, said program implementing the method according to claim 5.

8. A system, in particular a cache memory (15), used for making available a plurality of central processing units (110) for processing the data stored in a mass memory (130), said system comprising means adapted to implement the method described in claim 1.

9. A non-transient medium that can be read by a computer, containing the instructions of a program executable by said computer, said program implementing the method according to claim 1.

10. The method according to claim 1, in which selecting a most suitable input from among the browsed inputs includes the step of selecting a least recently used among the browsed inputs.

11. The method according to claim 1, in which selecting a most suitable input from among the browsed inputs includes the step of selecting an expired input among the browsed inputs.

12. The method according to claim 1, wherein the step of defining a maximum browsing time comprises specifying a maximum number of consecutive readings of inputs.

* * * * *